United States Patent [19]

Stoffel

[11] 4,447,830
[45] May 8, 1984

[54] IMAGE SCANNING APPARATUS AND METHOD
[75] Inventor: James C. Stoffel, Rochester, N.Y.
[73] Assignee: Xerox Corporation, Stamford, Conn.
[21] Appl. No.: 300,845
[22] Filed: Sep. 10, 1981
[51] Int. Cl.³ ............................................. H04M 7/12
[52] U.S. Cl. ..................................... 358/283; 358/288
[58] Field of Search ................. 358/288, 283, 199, 285

[56] References Cited
U.S. PATENT DOCUMENTS

| | | | |
|---|---|---|---|
| 3,723,640 | 3/1973 | Perreault | 358/288 |
| 3,912,861 | 10/1975 | Vandling | 358/288 |
| 4,065,788 | 12/1977 | Meier et al. | 358/166 |
| 4,084,188 | 4/1978 | Gorog | 358/199 |
| 4,132,977 | 1/1979 | Nagano | 340/146.3 AG |
| 4,149,090 | 4/1979 | Agylnek | 250/566 |
| 4,150,873 | 4/1979 | Dali | 358/285 |
| 4,173,772 | 11/1979 | White | 358/213 |
| 4,205,350 | 5/1980 | Gunning | 358/296 |
| 4,288,821 | 9/1981 | Lavallee et al. | 358/283 |

Primary Examiner—John C. Martin
Assistant Examiner—Edward L. Coles
Attorney, Agent, or Firm—Frederick E. McMullen

[57] ABSTRACT

Scanning apparatus having at least one self scanned array; a multispeed transport for carrying documents to be scanned past a scanning slit where the moving document is scanned line by line by the array at high speed on the assumption that most documents are composed of lines or text; processing the image signals produced by a line processing means; while scanning, using halftone and continuous tone detectors to look for halftone and continuous tone images respectively; where halftone images are detected, rescanning the line at low speed and processing the resulting image signals by a halftone processing means and thereafter reverting to high speed scanning; and where continuous tone images are detected, rescanning the entire document page at low speed and processing the resulting image signals by a continuous tone processing means and thereafter reverting to high speed scanning. Optionally, to enhance system operation, sub-sampling of the document being scanning when scanning at high speed may be performed.

11 Claims, 8 Drawing Figures

| IMAGE TYPE | | | PROCESSING SPEED |
|---|---|---|---|
| L.C. | | | FAST |
| | C.T. | H.T. | SLOW |

| IMAGE TYPE | | | PROCESSING SPEED |
|---|---|---|---|
| L.C. | C.T. | | FAST |
| | | H.T. | SLOW |

| IMAGE TYPE | | | PROCESSING SPEED |
|---|---|---|---|
| L.C. | | H.T. | FAST |
| | C.T. | | SLOW |

IMAGE SCANNING APPARATUS AND METHOD

The invention relates to an image scanning apparatus and method, and more particularly to a multi-speed scanning apparatus and method.

In document scanning systems, sometimes referred to as raster input scanners or RIS's, a problem arises when it is attempted to accommodate all of the various image types with one system. For as will be understood by those familiar with the subject, documents may comprise one of several image types, for example, line or text images, or low frequency halftone images, or high frequency halftone images, or continuous tone images, or combinations thereof. To achieve optimal image processing, each image type requires processing tailored to the needs of the particular image type. However, some image types such as halftone are more difficult to process than other types such as line copy. This presents the designer with a problem. If system costs are to be minimized, the more difficult image types can be processed at relatively slow rates using simple and inexpensive processing circuits. Unfortunately, this results in a system where the relatively short processing times required for the simpler, less complex image types, which normally make up the bulk of the images, are sacrificed for the more complex image types which may only appear infrequently.

If on the other hand the processing rates for the more difficult image types are speeded up and made to equal the processing speeds of the simpler less complex image types, a substantial penalty in both processing circuit cost and complexity is incurred.

In this context, U.S. Pat. No. 4,194,221 issued Mar. 18, 1980 to James C. Stoffel provides a scanning system wherein the image is categorized as line, halftone, or continuous tone while being scanned. Individual image signal processing circuits designed to provide optimum processing for each of the aforementioned image types are provided with the particular processing circuit selected in response to the image type determined. However, as indicated heretofore, overall system processing speed in multi-processing systems of the aforementioned type may be relatively slow leading to unwanted processing delays as when handling documents comprised of line or text images only.

The invention relates to a raster scanning apparatus for scanning a document to produce pixels repesentative of the images on the document comprising, in combination: first image processing means for processing at least line copy images; second image processing means for processing at least one other image type; scanner operating means for operating the scanning apparatus at high speed to scan the document images while actuating the first image processing means to process the pixels produced on the assumption that the images being scanned are at least line copy; and image monitoring means for monitoring the content of the images during scanning at high speed to detect the other image type; the scanner operating means operating the scanning apparatus to scan the images at reduced speed in response to detection of the other image type while actuating the second image processing means to process the pixels produced by scanning the image at reduced speed.

The invention also relates to a method of scanning an image bearing document to produce signals representative of the images scanned, the steps which comprise: scanning the document line by line at a first relatively high speed; while scanning at the first speed, monitoring the images being scanned to detect halftone images, and when halftone images are detected, scanning the document at a second relatively low speed.

IN THE DRAWINGS

Figures 5A, 5B, 5C, 6:
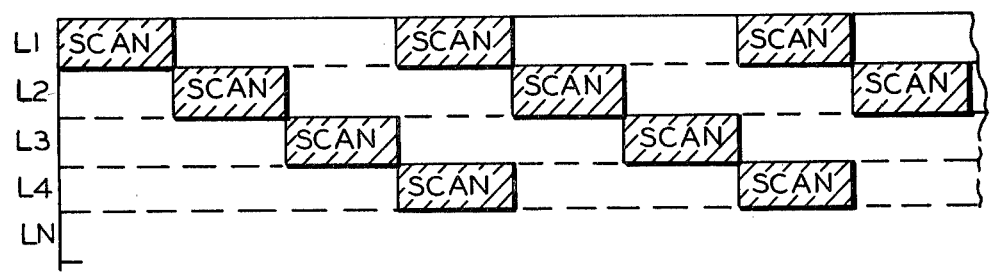

FIGS. 5a, 5b, 5c comprise block diagrams illustrating various combinations for processing line copy, halftone, and continuous tone images in accordance with the teachings of the present invention; and FIG. 6 is a view illustrating an exemplary skip scanning pattern.

Figure 1:
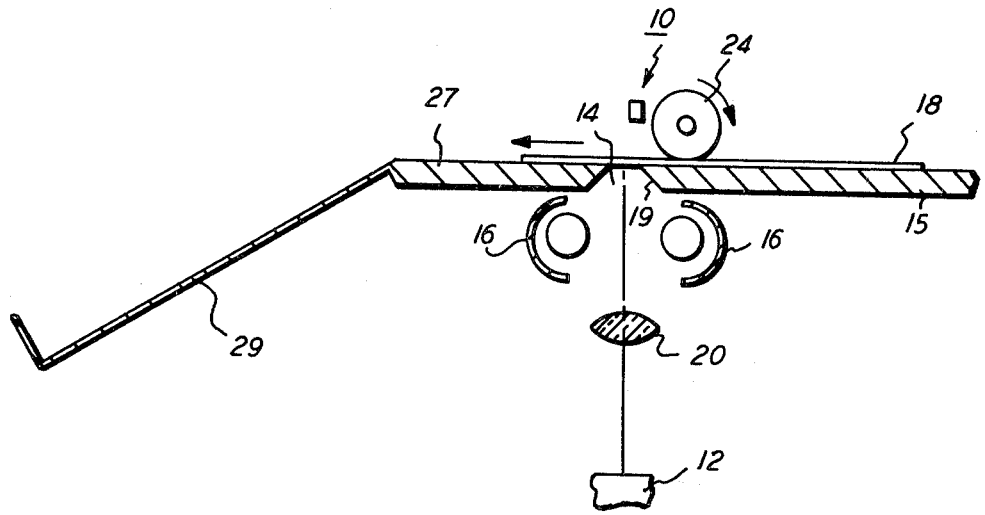
FIG. 1 is a schematic view of an exemplary document scanning apparatus embodying the principles of the present invention.

Referring particularly to FIG. 1, an exemplary scanning apparatus 10 embodying the principles of the present invention is thereshown. Scanning apparatus 10, which as will appear may operate in either a high or low speed image processing mode, includes a scanning array 12 disposed in preset spaced relation below an elongated document scanning slit 14 in document support member 15. Lamp pair 16 disposed below and on each side of scanning slit 14, serve to illuminate the portion of document 18 opposite slit 14. To facilitate illumination, sides 19 of support member 15 forming slit 14 are undercut. A suitable lens 20 may be provided to focus light rays reflected from the portion of document 18 opposite scanning slit 14 onto array 12.

While a single array 12 is shown herein, it will be appreciated the multiple scanning arrays may be employed. In that event the arrays may be arranged so that the fields of view of the arrays overlap.

A document feed roll 24 is provided to advance the document 18 to be scanned across scanning slit 14. Feed roll 24 is preferably driven by a suitable step motor 25 (shown in FIG. 2). Document support member 15 forms a substantially flat supporting surface 27 across which document 18 to be scanned is transported by feed roll 24. A catch tray 29 is preferably provided downstream of scanning slit 14 to receive scanned documents. Documents to be scanned may be supplied to feed roll 24 by any suitable means, as for example, by hand.

In operation, successive line scans are made across the document 18 by array 12 as the document is stepped across the scanning slit 14 by feed roll 24. As will be understood by those skilled in the art, the individual viewing elements that comprise array 12 are sampled successively as each line is scanned to produce a stream of image signals or pixels for each line scanned. The individual pixels produced each comprise a discrete voltage representation of the image area of document 18 viewed by the individual elements comprising array 12, the various voltage levels forming a relative measure of the image area gray scale.

One commercially available scanning array is a Fairchild 121-1728 pixel 2 phase linear array maufactured by Fairchild Manufacturing Company.

In content, the image on original 18 may be composed entirely of line copy (L.C.), or low frequency halftone or high frequency halftone (H.T.), or continuous tone (C.T.), or combinations thereof. Where the original image consists of line copy as for example a typed page, the image pixels may be converted to either one of two voltage levels, one representing non-image or background areas; the other image areas.

A continuous tone image comprises an unscreened image, typically a photograph. When scanned, the voltage values of the pixels produced are representative of the gray levels making up the picture.

A halftone image, typically a picture or scene, is one which has been reproduced though a screening process. One example is a newspaper picture. The screen used may be either a high or low frequency screen. A high frequency screen is arbitrarily defined herein as one having a frequency of 100 cells per inch or more while a low frequency screen is defined as one having a frequency less than 100 cells per inch. Halftone images, therefore, comprise a pattern of discrete dots, the dot size and frequency of which depends upon the screening frequency used. When viewed by the human eye, the dot pattern conveys a likeness of the original picture or scene. The quality of the reproduction depends upon the screening frequency used, with higher screen frequencies normally providing higher quality reproductions.

As will appear herein, documents 18 are initially scanned at relatively high speed (i.e. 10 ips) on the assumption that the document image is composed of lines or text. Processing of the image signals produced by scanning array 12 is done at a corresponding high rate.

While scanning at high speed, both halftone and continuous tone detection processes may be carried out to detect the presence of either halftoned or a mixture of halftoned and line images (referred to collectively herein as halftone), or of continuous images respectively. Where either halftone or continuous tone images are detected, the scanning apparatus 10 is switched to the low speed mode and the document is scanned at a slower speed (i.e. 2 ips) with the image signals produced processed at a slower rate. The portion of the document scanned and processed at the slower rate may vary depending on the type of image detected, and may comprise the entire document page including portions already scanned and processed as line copy, or the remaining unscanned portions of the document page only, or the line or portion of the line previously scanned.

Figure 4:
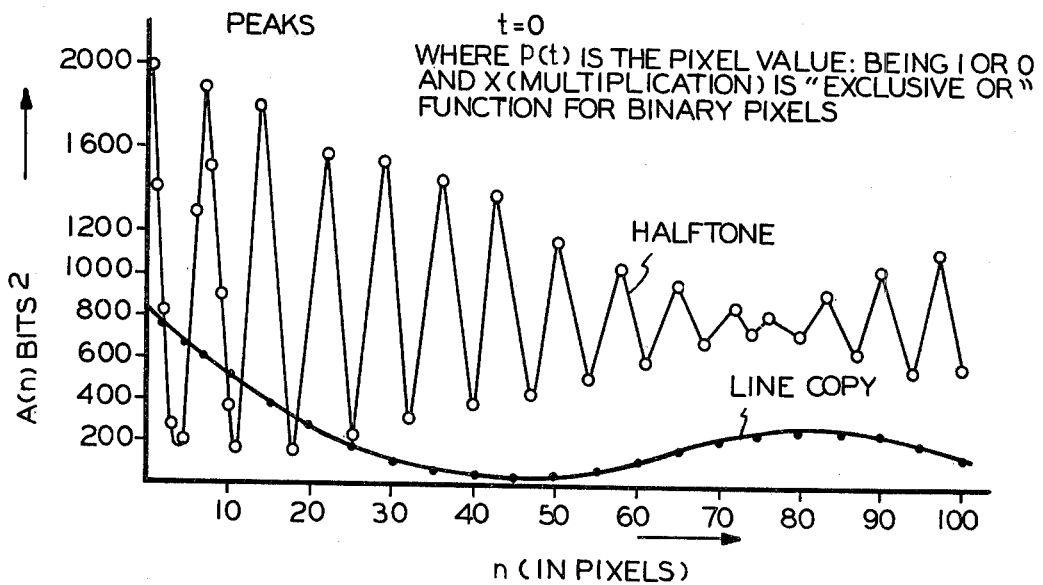
FIG. 4 is a plot of an exemplary halftone/line autocorrelation.
Figure 2:
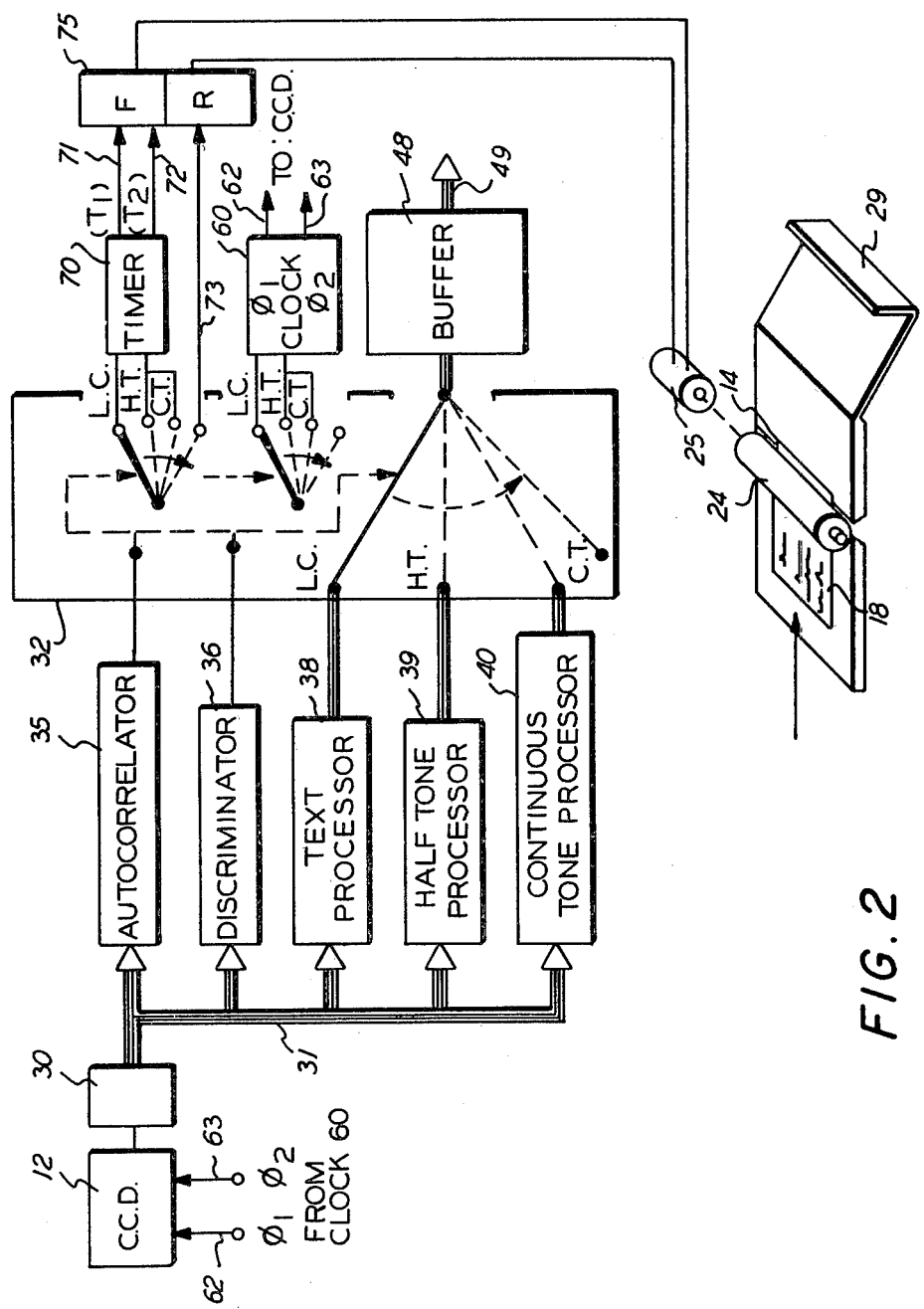
FIG. 2 is a schematic view illustrating the image scanning system of the present invention.
Figure 3:
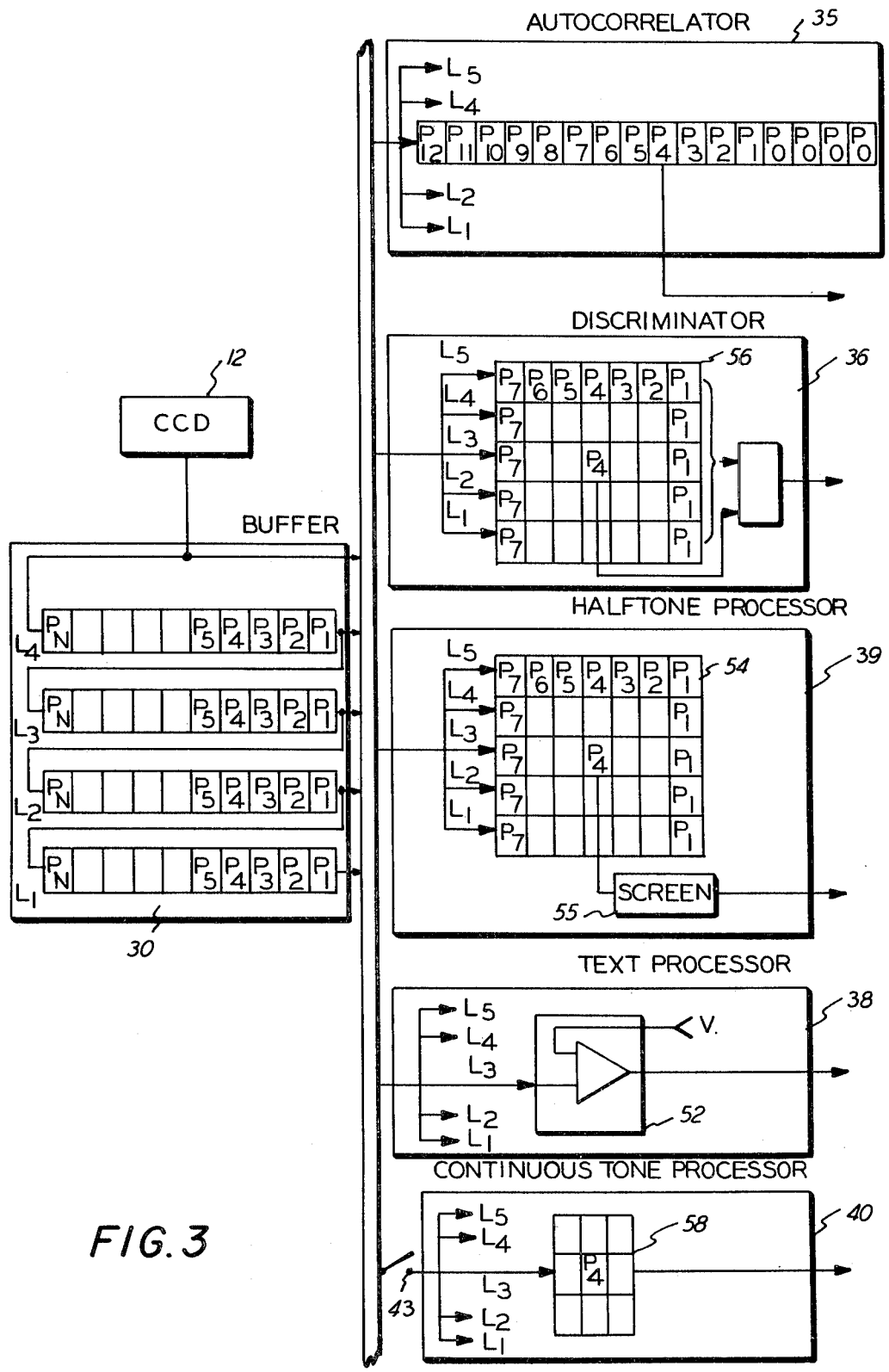
FIG. 3 is a schematic view illustrating details of the image processing apparatus used in the image scanning system of the present invention.

Referring now to FIGS. 2 through 4, the stream of image pixels from scanning array 12 is fed to a four line scrolling buffer 30. Buffer 30, which comprises any suitable commercially available serial in/serial out multirow buffer having a bit storage capacity sufficient to temporarily store four lines of image pixels, permits in the example illustrated, processing of image data in blocks of five lines. For convenience of explanation, the data lines being processed in the example are designated as lines $L_1$, $L_2$, $L_3$, $L_4$, $L_5$ with line $L_1$ representing the first scanned line of an original 18, line $L_2$ the second scanned line, etc.

In certain cases, as for example, where original 18 comprises a typed letter, it may be understood that the first few scanned lines may be all white, as representative of the top margin. Similarly, the last few scan lines, representing the bottom margin, and the areas on each side of the body of the letter, representing the side margins, may be all white. Individual pixel positions in each line are designated herein as pixels $P_1$, $P_2$, $P_3$, $P_4 \ldots P_n$, except in the case of margin areas and areas outside the document edges which are designated $P_0$. It will be understood that the number of image lines L and/or the number of pixels P processed may vary from a minimum of one to any convenient number.

The output of buffer 30 is coupled by bus 31 to autocorrelator 35 and discriminator 36 respectively and to text processor 38, halftone processor 39 and continuous tone processor 40. The outputs of text processor 38, halftone processor 39 and continuous tone processor 40 are coupled through a controller 32 to an output buffer 48 which serves to temporarily store pixels processed by text processor 38 pending a determination of whether due to image content, processing by either halftone processor 39 or continuous tone processor 40 is instead desirable. The output of buffer 48 is coupled by bus 49 to the data recipient which may for example comprise a memory, communication channel or the like.

To detect the presence of high frequency halftone image data, a one dimensional block of image pixels is unloaded from buffer 30 on a block by block basis into autocorrelator 35 which autocorrelates each pixel block in accordance with a predetermined algorithm to determine if the image data is halftone or not.

In order to enhance that decision, additional pixels on both sides of the block of pixels being investigated are used. In the exemplary arrangement shown, image data is processed on a pixel by pixel basis with pixel $P_4$ of line $L_3$ being the particular pixel in process at the instant shown in FIGS. 3 and 4.

Autocorrelation is carried out in accordance with the following function:

$$A(n) = \sum_{t=0}^{t=last} p(t) \times p(t+n)$$

where
n = the bit or pixel number;
p = the pixel voltage value; and
t = the pixel position in the data stream.

The size of the image data blocks examined may comprise one or more pixels, with a total block size including the block of image pixels being examined preferably being of from 16 to 64 pixels in length. In the exemplary arrangement shown, image pixels comprising image line $L_3$ are examined in blocks of one pixel each over a total pixel length of 16 pixels. In this example, the 7 pixels ($P_3$, $P_2$, $P_1$, $P_0$, $P_0$, $P_0$, $P_0$) preceding the pixel in question (pixel $P_4$) and the 8 succeeding pixels ($P_5$, $P_6$, $P_7$, $P_8$, $P_9$, $P_{10}$, $P_{11}$, $P_{12}$) are used in the autocorrelation process. Where the block of pixels being examined includes margin or areas outside the document edges, repesented by pixel $P_0$, a pixel value of "0" is arbitrarily used to represent the image value thereof.

The resulting data is scanned for positive peaks by a peak detector. Peaks above a certain threshold level are detected and where the distance between the voltage peaks in the signal is less than a preset number, a decision is made to treat the pixel block being examined as halftone image data. Where the distance between voltage peaks is greater than the preset number, a decision is made to treat the pixel block as line or text.

Scanning apparatus 10 is normally conditioned to operate in the high speed mode wherein the pixels output by array 12 are processed at a high rate by text processor 38 and the processed signals output to buffer 48 where the signals are held pending a decision whether or not to process the image in the low speed mode using either halftone or continuous tone processors 39, 40 respectively. Where halftone images are detected by autocorrelator 35, the signal output therefrom to controller 32 switches scanning apparatus to low speed mode. At the same time, the output of halftone processor 39 is coupled to buffer 48. Where continuous tone images are detected by discriminator 36, scanning apparatus is switched to low speed mode and continuous tone processor 40 actuated as will appear.

Text processor 38 comprises any suitable thresholding circuit 52 such as a Texas Instruments 74S85 comparator, effective to threshold the pixel being examined (pixel P4) with the output of circuit 52 being output via controller 32 to buffer 48. For example, thresholding circuit 52 may provide a single level threshold (V.) against which the pixel being examined (pixel P4) is compared.

Halftone processor 39 employs a descreening filter 54 for descreening halftone image signals output by array 12. For example, where the scanning frequency is 500 scan lines/inch, filter 54 may comprise a simple low pass 5×7 matrix linear filter preferably tailored to provide some enhancement for sharpening edges at the points where signal levels change, to smooth out the high frequency image levels from lines $L_1$, $L_2$, $L_3$, $L_4$, $L_5$. Following descreening, the image signal is fed to a relatively low frequency electronic screen 55 of the type preferably employing cyclic changes in threshold values whereat the image is rescreened at a lower frequency. Where, as above, the original sampling frequency is 500 scan lines/inch, one suitable screen comprises a 70 cells/inch 45° screen with conventional S-shaped Tone Reproduction Curve (TRC). The output of screen 55 is fed to output buffer 48 via controller 32.

Preferably, as will be understood by those skilled in the art, the size of the filter chosen scales with the sampling frequency.

Suitable circuitry for performing the aforementioned autocorrelating and halftone detection process may be readily envisioned by those skilled in the art. One example of suitable autocorrelating and halftone detection circuits may be found in the aforementioned U.S. Pat. No. 4,194,221.

The presence of continuous tone image data is determined by discriminator 36. For this purpose, pixels comprising line $L_3$ are examined on a pixel by pixel basis to determine the average gray value of a multipixel region which includes the pixel being examined. In the exemplary arrangement shown, the region examined comprises a 5×7 pixel matrix with pixel P4 at the center.

Discriminator 36 comprises an electronic filter 56 in a 5×7 matrix format for analyzing image data in blocks five scan lines wide (i.e. lines $L_1$, $L_2$, $L_3$, $L_4$, $L_5$) by seven pixel positions wide (i.e. pixels $P_1$, $P_2$, $P_3$, $P_4$, $P_5$, $P_6$, $P_7$). During processing, the value of the pixels in the filter matrix are multiplied by a predetermined fractional coefficient, the value of which may be different for each pixel position in the matrix and/or which may be varied on a cyclic basis, with the resulting values summed or added to provide a gray level average value (V average) for the neighborhood or image area around the pixel being examined, i.e. pixel $P_4$.

It should be understood that where the line of image data being processed comprises one of the first few (or last) lines of the document (i.e. lines $L_1$, $L_2$) a portion of the processing matrix is comprised of one or more imaginary lines of image data, the pixels $P_0$ of which are assigned an image value of "0".

The average value (V difference) in the neighborhood of $V_p$ is determined by filter 56 as:

V difference=$(V_p-V$ average), where $V_p$ is the value of the pixel being examined (i.e. pixel P4).

Where the absolute value of V difference is above a preset threshold, line copy and low frequency half-tone image data is determined to be present and no change in operation of scanning apparatus 10 takes place. Where the absolute value of V difference is below or equal to the threshold, continuous tone image data is determined to be present and a signal from discriminator 36 switches scanning apparatus 10 to low speed mode. At the same time, the output of continuous tone processor 40 is coupled to buffer 48.

Continuous tone processor 40 employs a suitable template screen, which may, for example, comprise a 3×3 binary pattern screen 58 to screen the image data and provide a binary level output representative of the pixel being processed (i.e. pixel P4) to buffer 48.

A suitable clock 60 provides high and low frequency clock pulses $\phi_1$, $\phi_2$ for driving scanning array 12 at either high or low speed. Clock pulses $\phi_1$, $\phi_2$ are output to array 12 via fast and slow clock lines 62, 63.

A suitable timer 70 is provided for operating step motor 25, timer 70 providing relatively high and low frequency stepping pulses $T_1$ $T_2$ via lines 71, 72 to the forward (F) terminal of step motor control 75. Feed roll 24, which is drivingly coupled to motor 25, accordingly steps the document page past scanning slit 14 at either a relatively high (i.e. 10 ips) or a relatively slow (i.e. 2 ips) speed in the forward direction commensurate with high and low speed operating modes. To reverse step motor 25 and operate feed roll 24 in the opposite or reverse direction, a reverse control line 73 is coupled to reverse (R) terminal of step motor control 75.

Controller 32 comprises any suitable circuitry for actuating clock 60 and step motor control 75, and for coupling one of line copy, halftone, or continuous tone processor 38, 39, 40 respectively to buffer 48 in accordance with the signal outputs of autocorrelator 35 and discriminator 36 respectively as will be apparent to one skilled in the art.

OPERATION

At startup and during scanning, it is presumed that the document page being scanned is composed of text, and accordingly scanning is conducted in the high speed mode. Under these circumstances, the output of text processor 38 is coupled to output buffer 48. At the same time, the high frequency clock pulses $\phi_1$ from pixel clock 60 are applied to scanning array 12 and high speed stepping pulses from timer 70 are output to the forward (F) terminal of step motor control 75. Step motor 25 accordingly drives feed roll 24 at high speed.

During high speed scanning of the document 18 by array 12, the image signals output by array 12 are simultaneously analyzed for the presence of halftone images by autocorrelator 35 and continuous tone images by discriminator 36. In one embodiment, where halftone images are detected by autocorrelator 35, the signal output of autocorrelator 35 couples halftone processor 39 to output buffer 48. At the same time, the signal from autocorrelator 35 switches clock 60 to apply low frequency clock signals $\phi_2$ to the array 12 and switches timer 70 to output low frequency stepping pulses ($T_2$) to the forward (F) terminal of step motor control 75.

Motor 25 accordingly drives document feed roll 24 at low speed to step the document page across scanning slit 14 at low speed.

In the embodiment shown, the reduction in operating speed of document feed roll 24 is normally sufficient to permit the previously scanned line to be rescanned at low speed. The image signals produced are processed by halftone processor 39 and the processed signals output to buffer 48. Following rescan of the line at low speed, scanning apparatus 10 may be returned to the high speed scan mode for the next succeeding line, or, if desired, operation in the slow speed mode with processing by halftone procesor 39 may be continued for a finite number of lins or for the remainder of the document page. Where the interval between the time when the line is scanned and the time when a decision is made on how the image signals are to be processed is relatively long, step motor 25 may be reversed by a signal to reverse control line 73 for a period necessary to bring the correct line into position opposite scanning slit 14. Further, where desired, step motor 25 may be reversed to cause feed roll 24 to return the document page to the start of scan position following which scanning is re-initiated at low speed in the manner described. In that circumstance, the entire document page is scanned including the previously scanned portion and the image signals processed by halftone processor 39.

Where continuous tone images are detected by discriminator 36, the signal from discriminator 36 couples continuous tone processor 40 to buffer 48. At the same time, clock 60 is switched to apply low frequency clock pulses $\emptyset_2$ to scanning array 12 and timer 70 reset to apply low frequency stepping pulses to motor 25. As described, scanning apparatus 10 operates in the low speed mode to process the document image, or portions thereof, as continuous tone.

Referring particularly to FIGS. 5a, 5b, 5c of the drawings, various image processing combinations are shown. FIG. 5a illustrates the arrangement previously discussed wherein the scanning apparatus 10 is arranged to process a document page as line copy (L.C.) at relatively high speed on the assumption that the document image is line copy. Concurrently therewith, the image is checked for the presence of both halftone (H.T.) and continuous tone (C.T.) images and where found, scanning apparatus 10 is switched to the low speed mode and the images processed by either halftone or continuous tone processor 39 or 40 as appropriate.

In the FIG. 5b arrangement, both line copy (L.C.) and continuous tone (C.T.) images are processed at high speed. Concurrently therewith, the images are scanned for the presence of halftone (H.T.) images, and where found, scanning apparatus 10 is switched to slow speed mode and the images processed by halftone processor 39.

In the FIG. 5c embodiment, both line copy (L.C.) and halftone (H.T.) images are processed at high speed while concurrently therewith the images are scanned for the presence of continuous tone (C.T.) images. Where continuous tone (C.T.) images are detected, the scanning apparatus 10 is switched to low speed mode and processing carried out using continuous tone processor 40.

It will be understood that document processing rates may be enhanced if high speed scanning, which is relied upon to both process line (i.e. text) type images as well as to detect the presence of either halftone or continuous tone images, is performed on only portions of the document page. Referring particularly to FIG. 6, there is shown an exemplary scan pattern wherein only portions of the document lines (i.e. $L_1, L_2, \ldots L_n$) are scanned during high speed scanning. To enhance image resolution, the pixel output of scanning array 12 may be interpolated.

Where halftone or continuous tone images are detected, rescanning of either the document line, or of the remaining unscanned portions, or of the entire document page may be preferably performed as described heretofore.

Scan patterns other than that shown in FIG. 6 may be readily envisioned.

While the invention has been described with reference to the structure disclosed, it is not confined to the details set forth, but is intended to cover such modifications or changes as may come within the scope of the following claims.

I claim:

1. Raster scanning apparatus for scanning an image to produce pixels representative of said image, comprising in combination:
    (a) first image processing means for processing at least line copy images;
    (b) second image processing means for processing at least one other image type;
    (c) control means for operating said scanning apparatus at high speed to scan said image while actuating said first image processing means to process the pixels produced on the assumption that said image comprises at least line copy; and
    (d) image monitoring means for monitoring the content of said image while said image is being scanned at high speed to detect said other image type;
said control means operating said scanning apparatus to scan said image at reduced speed in response to detection of said other image type while actuating said second image processing means to process the pixels produced by scanning said image at said reduced speed.

2. The raster scanning apparatus according to claim 1 in which only portions of said image are scanned at high speed.

3. The raster scanning apparatus according to claim 1 in which said other image type comprises halftone images, said second image processing means comprising halftone image processing means for processing halftone images detected by said image monitoring means.

4. The raster scanning apparatus according to claim 1 in which said other image type comprises continuous tone images, said second image processing means comprising continuous tone image processing means for processing continuous tone images detected by said image monitoring means.

5. The raster scanning apparatus according to claim 1 in which said other image type comprises both halftone and continuous tone images, said second image processing means including halftone image processing means for processing halftone images and continuous tone image processing means for processing continuous tone images.

6. A multi-speed raster scanner for scanning a document page to produce image signals representative of the image thereon, comprising, in combination:
    (a) means for operating said scanner to scan said document page at a first relatively high speed;
    (b) image monitoring means operable while scanning at said first speed to monitor the image content of each line of said document page as said line is being scanned for high frequency halftone images, and (c) control means responsive to the detection of said high frequency halftone images by said monitoring means to intervene and cause said scanner to commence scanning said document page at a second relatively low speed, said control means causing said scanner to scan the remainder of said document page at said second relatively low speed.

7. The scanner according to claim 6 including:

thresholding means for processing image signals produced by said scanner when scanning at said first speed; and descrreening means for descrreening image signals produced by said scanner when scanning at said second speed, and screening means for rescreening said descreened image signals.

8. The scanner according to claim 6 including:

at least one array of scanning elements;

means for supporting documents to be scanned in scanning relationship with said array; and means for producing relative scanning movement at said first and second speeds selectively between said array and the document page being scanned.

9. A method of scanning an image bearing document to produce signals representative of the images scanned, the steps which comprise:

(a) scanning said document line by line at a first relatively high speed;

(b) thresholding image signals produced by scanning at said first speed;

(c) while scanning at said first speed, monitoring the images being scanned to detect halftone images;

(d) when halftone images are detected, scanning the document at a second relatively lower speed, (e) descreening image signals produced by scanning at said second speed; and (f) rescreening the descreened image signals.

10. The method according to claim 9 including the step of scanning the entire document at said second relatively low speed.

11. The method according to claim 9 including the step scanning the remaining unscanned portion of said document at said second relatively low speed.

* * * * *